(12) United States Patent
Nupponen

(10) Patent No.: US 11,573,771 B2
(45) Date of Patent: Feb. 7, 2023

(54) PREDICTING CODE EDITOR

(71) Applicant: QENTINEL OY, Espoo (FI)

(72) Inventor: Kimmo Nupponen, Espoo (FI)

(73) Assignee: QENTINEL QUALITY INTELLIGENCE OY, Espoo (FI)

( * ) Notice: Subject to any disclaimer, the term of this patent is extended or adjusted under 35 U.S.C. 154(b) by 91 days.

(21) Appl. No.: 17/242,869

(22) Filed: Apr. 28, 2021

(65) Prior Publication Data

US 2021/0349696 A1 Nov. 11, 2021

(30) Foreign Application Priority Data

May 5, 2020 (FI) ..................... 20205459

(51) Int. Cl.
*G06F 8/33* (2018.01)
*G06N 7/00* (2006.01)

(52) U.S. Cl.
CPC ............... *G06F 8/33* (2013.01); *G06N 7/005* (2013.01)

(58) Field of Classification Search
None
See application file for complete search history.

(56) References Cited

U.S. PATENT DOCUMENTS

| | | | |
|---|---|---|---|
| 9,519,464 B2 | 12/2016 | Dang et al. | |
| 10,338,893 B2 | 7/2019 | Beckwith et al. | |
| 10,656,924 B2* | 5/2020 | Neeman | G06F 8/70 |
| 10,915,302 B2* | 2/2021 | Lin | G06F 8/34 |
| 11,030,074 B2* | 6/2021 | Gao | G06F 11/362 |
| 11,182,132 B1* | 11/2021 | Vompolu | G06F 8/75 |
| 11,403,599 B2* | 8/2022 | Gray | G06Q 10/06375 |
| 2012/0017232 A1* | 1/2012 | Hoffberg | G06N 20/00 725/9 |
| 2013/0330008 A1* | 12/2013 | Zadeh | G06N 20/00 382/195 |
| 2014/0165028 A1* | 6/2014 | Balasu | G06F 8/33 717/109 |
| 2019/0227774 A1 | 7/2019 | Banuelos et al. | |
| 2019/0303107 A1 | 10/2019 | Kelly | |
| 2019/0303108 A1* | 10/2019 | Fu | G06N 7/005 |
| 2020/0097261 A1* | 3/2020 | Smith | G06F 8/33 |
| 2021/0150129 A1* | 5/2021 | Horesh | G06F 40/166 |

OTHER PUBLICATIONS

Search Report for FI20205459 dated Jan. 11, 2021, 2 pages.

* cited by examiner

*Primary Examiner* — Anna C Deng
(74) *Attorney, Agent, or Firm* — Nixon & Vanderhye PC

(57) ABSTRACT

According to an aspect, there is provided a computing device for performing the following. The computing device obtains, in a code editor, one or more logical lines of code for a program. The computing device predicts, using a first prediction algorithm, one or more most probable next program instructions based on said one or more logical lines of code and displays them to the user. In response to receiving a selection of a program instruction, the computing device inserts a selected program instruction to the code editor. The computing device predicts, using a second prediction algorithm, one or more most probable sets of zero or more parameters based on a selected program instruction and said one or more logical lines of code and displays them to the user. In response to receiving a selection of a set, the computing device inserts a selected set to the code editor.

15 Claims, 6 Drawing Sheets

Qentinel AI-assisted Editor   Configuration

```
 1   *** Settings ***
 2   Resource            ${CURDIR}${/}../resources/keywords.robot
 3   Suite Setup         Setup Browser
 4   Suite Teardown      End suite
 5
 6
 7   *** Test Cases ***
 8
 9   Example test cases
10       Appstate    loginpage
         Continue to add test steps to test case 'Example test cases'
11       ┌─────────────────────────────────────────────────┐
         │ ClickText              Click text on web page. ⓘ │
         │ TypeText                                         │
         │ VerifyText                                       │
         │ QentinelDoLoginAAD                               │
         └─────────────────────────────────────────────────┘
```

401 brackets lines 1–10; 402 points to suggestion box.

Fig. 4

Qentinel AI-assisted Editor   Configuration

```
 1   *** Settings ***
 2   Resource            ${CURDIR}${/}../resources/keywords.robot
 3   Suite Setup         Setup Browser
 4   Suite Teardown      End suite
 5
 6
 7   *** Test Cases ***
 8
 9   Example test cases
10       Appstate    loginpage
         ClickText takes 1 argument (text) and 5 optional arguments (anchor, timeout, parent, child and js)
11       ClickText
                  ┌──────────────────────────────────────────────────────┐
                  │ Temp test project ${project_timestamp}  Temp test proj.. ⓘ │  501
                  │ Temp test project                                    │
                  │ Temp test                                            │
                  │ Temp                                                 │
                  │ ${QENTINEL_LOGO}                                     │
                  │ No                                                   │
                  │ ${PROJECTS_MENU_LINK}                                │
                  └──────────────────────────────────────────────────────┘
```

Fig. 5

PREDICTING CODE EDITOR

This application claims priority to FI Patent No. 20205459 filed May 5, 2020, the entire content of which is hereby incorporated by reference.

FIELD OF THE INVENTION

The present invention relates to smart script and code editors.

BACKGROUND

Smart code editors (or smart integrated development environments, IDEs or smart script editors) provide a variety of functionalities to facilitate the code writing. For example, one function usually provided in smart code editors is an autocomplete function (sometimes called a code completion function). The autocomplete function provides the user suggestions on how the line of code the user is currently typing should be completed based on the characters the user has already typed on said line. The prediction is often performed based on a word prediction dictionary or sometimes using more advanced solutions such as machine-learning. Several limitations, however, exist with the autocomplete solutions. Firstly, the predictions are obviously limited only to suggestions which complete a program instruction which the user has started to type. Secondly, while the training data used for training the machine-learning model may encompass large amounts of code acquired from the Internet, not all of said code is necessarily appropriate for the particular coding task of a user in a particular application area (e.g., script writing for test automation or robotic process automation). This may lead to the machine-learning algorithm based on the machine-learning model providing incorrect or at least non-optimal suggestions for the user. Therefore, there is a need for smart code editor solution which would provide more meaningful and robust predictions and thus further facilitate the task of writing code.

BRIEF DESCRIPTION OF EMBODIMENTS

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

BRIEF DESCRIPTION OF THE DRAWINGS

In the following the invention will be described in greater detail by means of preferred embodiments with reference to the attached drawings, in which

FIGS. 4 to 5 illustrate exemplary operation of a code editor according to embodiments.

DETAILED DESCRIPTION OF EMBODIMENTS

Figure 1:
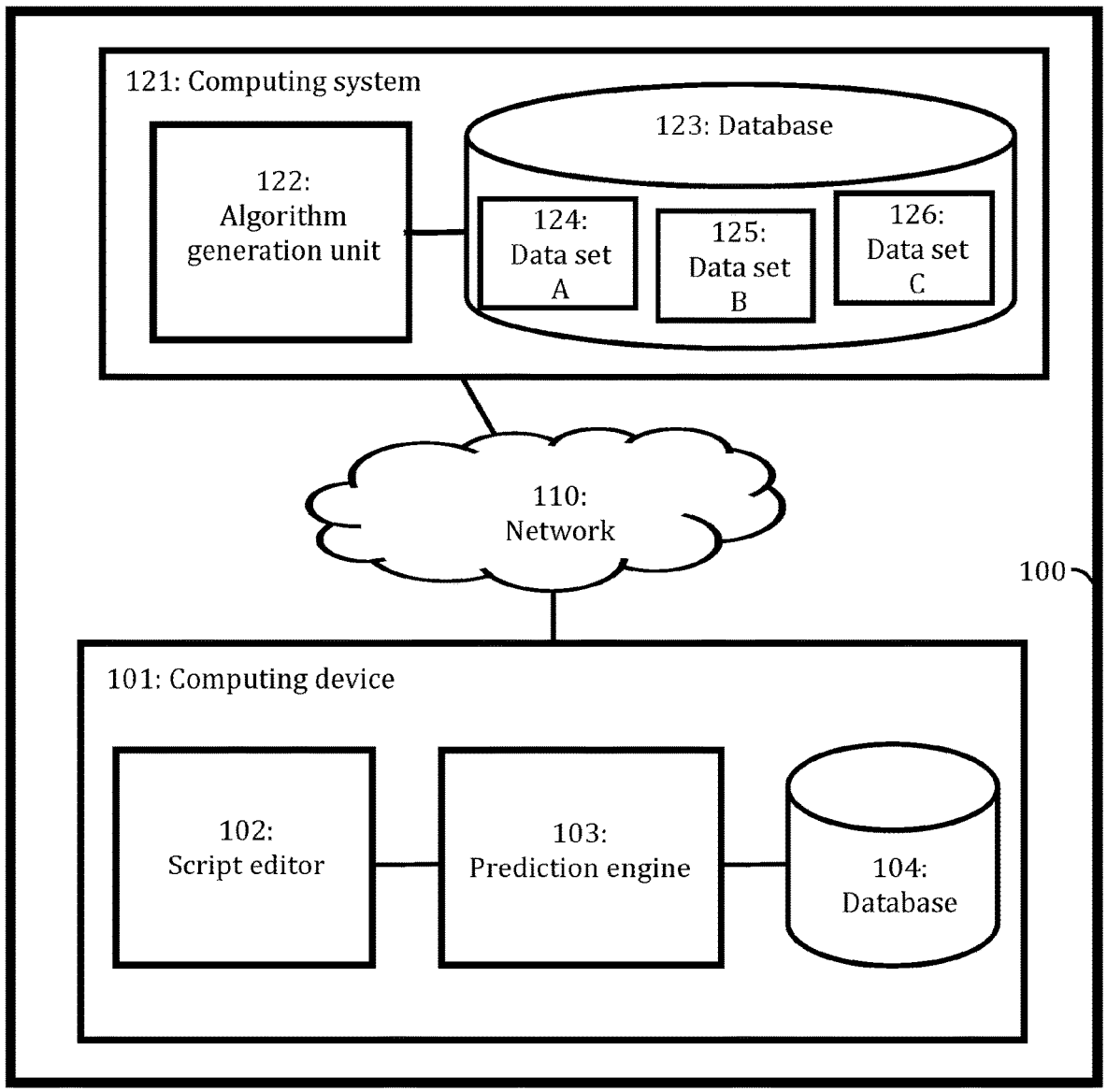
FIGS. 1 and 2 illustrate systems to which embodiments of the invention may be applied.

It will be obvious to a person skilled in the art that, as the technology advances, the inventive concept can be implemented in various ways. The invention and its embodiments are not limited to the examples described above but may vary within the scope of the claims.

Smart code or script editors (or smart integrated development environments, IDEs) provide a variety of functionalities to facilitate the code writing. For example, one function usually provided in smart code editors is an autocomplete function. The autocomplete function provides the user suggestions on how the line of code the user is currently typing should be completed based on the characters the user has already typed on said line. The prediction is often performed based on a word prediction dictionary or sometimes using a trained machine-learning algorithm. Several limitations, however, exist with the autocomplete solutions. Obviously, the predictions are limited only to suggestions which complete a program instruction which the user has started to type. Further, while the training data used for training the machine-learning algorithm may encompass large amounts of code acquired from the Internet, not all of said code is necessarily appropriate for the particular coding task of a user in a particular application area. This may lead to the machine-learning algorithm providing incorrect or at least non-optimal suggestions for the user. Therefore, there is a need for smart code editor solution which would provide more meaningful and robust predictions and thus further facilitate the task of writing code/script.

The embodiments seek to overcome or at least to alleviate at least some of the problems described above by providing a smart editor solution using which predictions of user inputs (i.e., next lines of code to be typed) may be provided to the user even before the user has started typing on a particular line. In other words, instead of providing the user suggestions on how to complete a particular incomplete line of code, the solutions according to embodiments provide suggestions on how to continue the code or script as a whole following one or more logical lines of code (i.e., one or more statements) already typed by the user. Specifically, at least some of the embodiments are based on the idea of using information from different local (i.e., user-specific) and public data sources for predicting different parts of the code (e.g., functions and arguments). The embodiments may be employed especially in writing scripts for for test automation or robotic process automation.

The predictions offered by the code editor make the programming/scripting process extremely efficient. The code editor according to embodiments helps to make sure that the user does not accidentally omit steps that are required for achieving overall goals of programming/scripting which often include completeness and quality. Further, the code editor according to embodiments supports professional development of the user as a coder by providing guidance regarding best practices in writing code. The predictions offered by the code editor may, in one extreme, eliminate the need of manual programming/scripting altogether as the user may simply "write" code by iteratively selecting and accepting the next program instruction and parameters for said program instruction from the list of suggestions provided by the code editor.

At least some of the embodiments to be discussed below in detail are based on training an artificial neural network (NN) such as a recurrent neural network and subsequently using said trained neural network for predicting next logical lines of code (or specifically next program instructions such functions or keyword and/or parameters or arguments to be provided for said program instructions) in a code editor. To facilitate the following detailed discussion on the embodiments based on neural networks, neural networks are discussed here briefly in general.

The embodiments may employ one or more neural networks for machine learning. Neural networks (or specifically artificial neural networks) are computing systems comprised of highly interconnected "neurons" capable of information processing due to their dynamic state response to external inputs. In other words, an artificial neural network is an interconnected group of nodes (or "neurons"), where each connection between nodes is associated with a weight (i.e., a weighting factor), the value of which affects the strength of the signal at said connection and thus also the total output of the neural network. Usually, a bias term is also added to the total weighted sum of inputs at a node. Training of a neural network typically involves adjusting said weights and biases so as to match a known output given a certain known input. The inputs of the neural network (or any other machine-learning model) are commonly called features while the outputs of the neural network (or any other machine-learning model) are called labels.

The neural network employed in embodiments may be deep neural networks (DNN), that is, artificial neural networks (ANN) with multiple layers between the input and output layers. Alternatively or additionally, the neural network used in embodiments may be dense neural network. Dense neural networks are neural network where layers are fully connected (i.e., dense) by the neurons in a network layer. In other words, each neuron in a layer receives an input from all the neurons present in the previous layer. Correspondingly, a dense layer is a fully connected layer, meaning all the neurons in a layer are connected to those in the next layer.

Neural network may be divided into feedforward neural networks and recurrent neural networks. An example of a feedforward neural network which may be employed in embodiments is a multilayer perceptron model or network which is a network of simple perceptrons. A single layer perceptron can be used to learn linearly separable functions but cannot be used to perform complex tasks like learning a non-linear decision boundary in classification. On the other hand, a multilayer perceptron network, which uses two or more layers of perceptrons, may be used to learn complex functions and highly non-linear decision boundaries. A multilayer perceptron network is a basic form a feedforward neural network and typically consists of an input layer, one or more hidden layers and an output layer. The network uses forward passes and backpropagation to learn the weights and bias. Forward passes (from input to output) calculate the outputs, while backpropagation calculates the necessary updates for the weights and biases based on the error at the output layer.

Convolutional neural networks (CNNs) are regularized versions of multilayer perceptrons. Multilayer perceptrons usually mean fully connected networks, that is, each neuron in one layer is connected to all neurons in the next layer. The "fully-connectedness" of these networks makes them prone to overfitting data. Typical ways of regularization include adding some form of magnitude measurement of weights to the loss function. CNNs take a different approach towards regularization: they take advantage of the hierarchical pattern in data and assemble more complex patterns using smaller and simpler patterns. Therefore, on the scale of connectedness and complexity, CNNs are on the lower extreme. In general, CNNs may be defined as neural networks that use convolution in place of general matrix multiplication in at least one of their layers.

Recurrent neural networks (RNNs), in contrast to feedforward neural networks, have loops in them and thus possess the capability of storing information. One example of a recurrent neural network which may be employed in embodiments is a long short-term memory (LSTM) which is a special type of recurrent neural network specialized in learning long-term dependencies. A single LSTM cell consists of three gates (input, output and forget gate) and a memory cell. Gates act as regulators of information and help LSTM cells to remove old information or add new information. The extent to which the existing memory is forgotten is controlled by the forget gate. Another example of a recurrent neural network which may be employed in embodiments and which is also capable of learning long-term dependencies is a gated recurrent unit (GRU). While long short-term memories employ three gates, there are only two gates in a GRU (called reset and update gate) which makes gated recurrent units simpler and faster than long short-term memories. Other recurrent neural networks may also be employed in connection with embodiments.

In some embodiments, support vector machines (SVMs) may be employed for machine learning. SVMs are supervised learning models with associated learning algorithms that analyze data used for classification and regression analysis. Given a set of training examples, each marked as belonging to one or the other of two categories, an SVM training algorithm builds a model that assigns new examples to one category or the other, making it a non-probabilistic binary linear classifier (although methods such as Platt scaling exist to use SVM in a probabilistic classification setting).

In embodiments to be discussed below, neural networks are specifically employed for multi-class classification based on a sequence of one or more items (i.e., features in the machine learning). Said items may be program instructions, parameters or combinations of the two types (see the definition in the next paragraph). The outputs (or labels) of the machine learning process are also either program instruction or parameters.

In the following discussion of detailed embodiments, the following definitions may apply. A program instruction may correspond to any of the following: a function, a keyword, a step, a method, a procedure, a statement, an expression, a routine, a subroutine, or a subprogram. A program instruction may be equally called a (logical) action. Further, a parameter may correspond to any input required by any program instruction (including any types listed above). A parameter may be, for example, a (function) parameter or an argument. The term "program instruction" is assumed, in the following, to exclude any possible parameters defined for the program instruction. Moreover, "a program" as used in embodiments is a generic term which covers also scripts. "Code" as used in connection with embodiments may refer specifically to source code (of a program). Further, the embodiments discussed below are not limited to any particular programming or scripting language or syntax used therein. Furthermore, a machine-learning algorithm may be defined as a prediction algorithm based on one or more machine-learning models (e.g., one or more neural networks). A logical line of code is defined as a section or part of code containing a single executable statement (e.g., a program instruction and a set of zero or more parameters defined for said program instruction). For example, in C-like programming languages, each logical line of code ends with a (statement-terminating) semicolon. A single logical line of code may correspond to a single physical line of code, a part of a single physical line of code or multiple physical lines of code (depending, e.g., on the programming style used).

An architecture of a communications system to which embodiments of the invention may be applied is illustrated in FIG. 1. FIG. 1 illustrates a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures.

FIG. 1 illustrates a system comprising a computing system 121 which is connected via a communications network 110 to a computing device 101. Specifically, the computing device 101 may be a local computing device and the computing system 121 may be a remote computing system or a local computing system.

The computing device 101 (equally called a user device or user equipment, UE or a terminal device) refers to a portable or non-portable computing device (equipment, apparatus). Computing devices which may be employed include wireless mobile communication devices operating with or without a subscriber identification module (SIM) in hardware or in software, including, but not limited to, the following types of devices: desktop computer, laptop, touch screen computer, mobile phone, smart phone, personal digital assistant (PDA), handset, e-reading device, tablet, game console, note-book, multimedia device, sensor, actuator, video camera, car, wearable computer, telemetry appliances, and telemonitoring appliances. In a typical non-limiting embodiment, the terminal device 101 may be a desktop computer or a laptop computer.

The computing device 101 comprises a code editor (software) 102, a prediction engine or unit 103 integrated into the code editor 102 and database 104. The computing device 101 may further comprise any conventional software/hardware elements of a desktop or laptop computer such as one or more user input devices (e.g., a keyboard and a mouse) and a display.

The computing device 101 is configured to run a code editor software 102 enabling a user of the computing device to write code using at least one user input device (e.g., a keyboard) of the computing device 101. The code editor may, in some embodiments, be specifically a script editor (i.e., a code editor for writing scripts using a scripting language). The code editor 102 may be or form a part of an integrated development environment (IDE). The syntax and the semantics of the code may vary, and the embodiments are not limited to any one scripting, modelling or programming notation.

Depending on the current editing context of the code editor 102, the code editor 102 may be configured to extract various pieces of information from the editor buffer of the code editor 102 and provide said information to the prediction engine 103 for performing predictions. This may involve, for example, extracting a sequence of all the program instructions (i.e., logical actions defined by the user), such as function, method or keyword calls that precede a certain position (i.e., an empty line) in the code as well as parameters or arguments of said program instructions. The embodiments seek to predict what the next program instructions in the sequence should be. The contextual information that the editor collects is, therefore, very much tied to the objective at hand. The approach itself is agnostic of the chosen objective.

The code editor 102 is further configured to present results of the prediction (and possibly one or more metrics relating to the results of the prediction) performed by the prediction engine 103 to the user of the computing device 101 (via a display) and to enable the user to make a selection from the results of the prediction (via a user input device). The results of the prediction may be presented to the user, for example, as a pop-up menu.

The computing device 101 further comprises a prediction engine or unit 103 running in connection with the code editor 102 (being integrated to it) and providing prediction functionalities according to embodiments for the code editor 102. Specifically, the prediction engine 103 may be configured to predict one or more most probable next actions (i.e., program instructions including also any parameters) to be typed by the user of the code editor 102 based on one or more preceding logical lines of code (received from the code editor 102). In some embodiments, the prediction may be performed even if no preceding logical lines of code exist (i.e., the line of code to be predicted is the initial line of code in a program). The prediction engine 103 may employ, for the prediction, one or more prediction algorithms (e.g., trained machine-learning algorithms) generated by the computing device 101 and/or by another apparatus (or specifically by the computing system 121). Said one or more prediction algorithms may be real-time algorithms. Separate prediction algorithms may be provided for predicting program instructions (i.e., functions, keywords and methods) and arguments or parameters associated with said program instructions. The information on the one or more preceding lines received from the code editor 102 may be pre-processed (e.g., tokenized and/or vectorized) before using them as an input for the prediction algorithms. Each prediction algorithm may have been generated based on some form of a priori information. The a priori information, or the data, leveraged by the prediction engine may be sourced from multiple data sources and it may involve some hand-crafted expert mechanism as well. That is, the approach may base the predictions on a collection of arbitrary data from which it draws conclusions from or it may well be a hand-crafted expert approach that instead of leveraging any datasets, for example, it makes decisions and predictions based on expert knowledge for example utilizing a database of hand-crafted rules.

The database 104 comprises at least information required for running the code editor 102 and the prediction engine 103. For example, said information comprised in the database 104 may comprise one or more prediction algorithms, one or more programs or scripts written using the code editor 102 and/or information extracted from said code and being usable as an input for the prediction using the prediction engine 103. Said one or more programs may comprise both finished programs and programs which are still works-in-process.

The communications network 110 enabling communication between the computing device 101 and the computing system 121 may comprise one or more wireless networks and/or one or more wired networks. Said one or more wireless networks may be based on any mobile system, such as GSM, GPRS, LTE, 4G, 5G and beyond, and a wireless local or personal area network, such as Wi-Fi or Bluetooth. The communications network 110 may comprise the Internet.

The computing system 121 may comprise at least an algorithm generation unit 122 connected to a database 123. The algorithm generation unit 122 may be a non-distributed server or a distributed server (a cloud server) and the database 123 may be a non-distributed database or a distributed database (a cloud database). The computing system 121 may also comprise one or more other network devices (not shown in FIG. 1), such as a terminal device, a server and/or a database. The computing system 121 is configured to communicate with the computing device 101 via the communications network 110. The computing system 121 and the database 123 may form a single database server, that is, a combination of a data storage (database) and a data management system or they may be separate entities. The data storage may be any kind of conventional or future data repository, including distributed and/or centralised storing of data, a cloud-based storage in a cloud environment (i.e., a computing cloud), managed by any suitable data management system. The implementation of the data storage is irrelevant to the invention, and therefore not described in detail here. In some embodiments, the computing system 121 may be a fully cloud-based computing system. Further, it should be appreciated that the location of the computing system 121 is irrelevant to the invention (i.e., it may be a remote system or a local system in view of the computing device 101). The computing system 121 may be operated and maintained using one or more other network devices in the system or using a terminal device (not shown in FIG. 1) via the communications network 110.

While FIG. 1 shows that the computing system 121 is connected via the communications network 110 to a single computing device 101 for simplicity of presentation, in other embodiments, the computing system 121 may be connected via the communications network to multiple computing device (each being similar to the computing device 101).

The algorithm generation unit 122 according to embodiments may be configured to process data in the database 123 for generating prediction algorithms (and prediction models used by said prediction algorithms) for use by the prediction engine 103 of the computing device 101. The algorithm generation unit 122 may be, for example, a machine-learning unit for generating and training machine-learning algorithms (i.e., prediction algorithms based on one or more machine-learning models). In other embodiments, the algorithm generation unit 122 may be configured to generate prediction algorithms of some other type such as ones based on weighted search trees.

The database 123 may comprise a plurality of data sets 124 to 126 used for generating prediction algorithms (e.g., training a machine-learning algorithm). Each data set 124 to 126 may comprise at least (finished or finalized) code defining a set of programs (or scripts). The set of programs associated with a particular data set may correspond to a shared use case or application and/or they may originate from a shared data source (e.g., from a particular computing device or from a particular public library of programs). Alternatively or additionally, said set of pros grams may be associated with a particular user of a code editor or a particular group of users (e.g., users associated with a particular organization or company). On the other hand, some of the data sets 124 to 126 may comprise a very large set of programs created by a plurality of user and for a plurality of different use cases and applications. The scope of a given data set depends, for example, on the machine-learning algorithm which is to be trained using said data set and input and outputs (i.e., features and labels) defined for said machine-learning algorithm. By selecting different data sets 124 to 126 as the basis for the prediction algorithm generation (e.g., the data set may acts as a training data set for a machine-learning algorithm), prediction algorithms which are specific to a particular use case, application, user and/or group of users may be generated. Programs written by a user using the computing device 101 may be transmitted (or uploaded) to the database via the communications network 110. At least some of the data sets 124 to 126 may have been defined by a user of the computing device 101.

In some embodiments, the data sets 124 to 126 maintained in the database 123 and used by the algorithm generation unit 122 may also comprise data other than finished programs or scripts created earlier. For example, the data sets 124 to 126 may comprise execution log files and/or user documentation. Similar to the finished programs or scripts, each execution log file and each user documentation may define (e.g., as code or pseudocode) at least one sequence of program instructions and preferably also sets of zero or more parameters for said program instructions. The user documentation may, for example, explicitly define best practices to be used in writing programs/scripts. Alternatively, best practices may be derived based on execution log files (e.g., based on successful and failed executions of programs defined in execution log files or based on an error in a program detected by a test script according to a test execution log file).

Figure 2:
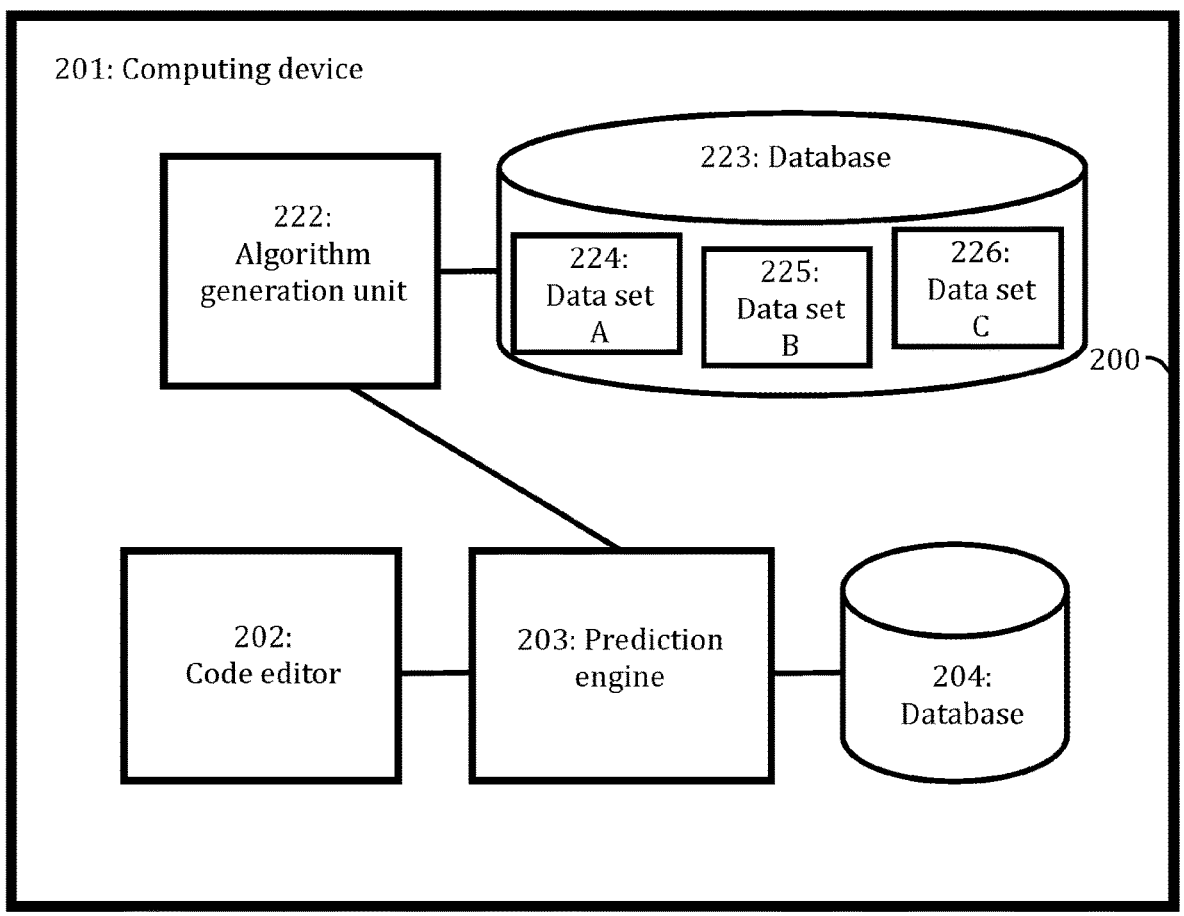

While in FIG. 1 it was assumed that the generation of the prediction algorithms was carried out by a separate entity from the computing device 101 running the code editor 102 and being operated by a user, in other embodiments, both functionalities may be carried out (locally) by a single computing device which is also running the code editor. One such an alternative architecture is illustrated in FIG. 2 where a single computing device 201 providing functionalities of both the computing device 101 and the computing system 121 of FIG. 1 is provided. The above description pertaining to FIG. 1 and elements therein applies also for system of FIG. 2 and is thus not repeated here for brevity. In other words, elements 202 to 204, 222 to 226 may correspond to elements 102 to 104, 122 to 126 of FIG. 1 as described above (taking into account obvious differences such as that communication between the algorithm generation unit 222 and the prediction engine 203 is no longer provided via a communications network as they are parts of the same computing device).

In some embodiments, a combination of the architectures of FIGS. 1 and 2 may be provided. In other words, both the computing device running the code editor and the (remote) computing system may be configured to perform algorithm generation functionalities. In such embodiments, some of the said functionalities may be carried out by the computing device running the code editor and others by the computing system. For example, computationally demanding tasks such as generating and training complex machine-learning algorithms (or specifically one or more machine-learning models employed by the machine-learning algorithms) may be carried out by the computing system while the computing device may carry out such tasks which may be performed without seriously burdening the processor of the computing device and thus hindering the usability of the code editor (e.g., generation of a weighted search tree algorithm or other more simple prediction algorithms).

Figure 3:
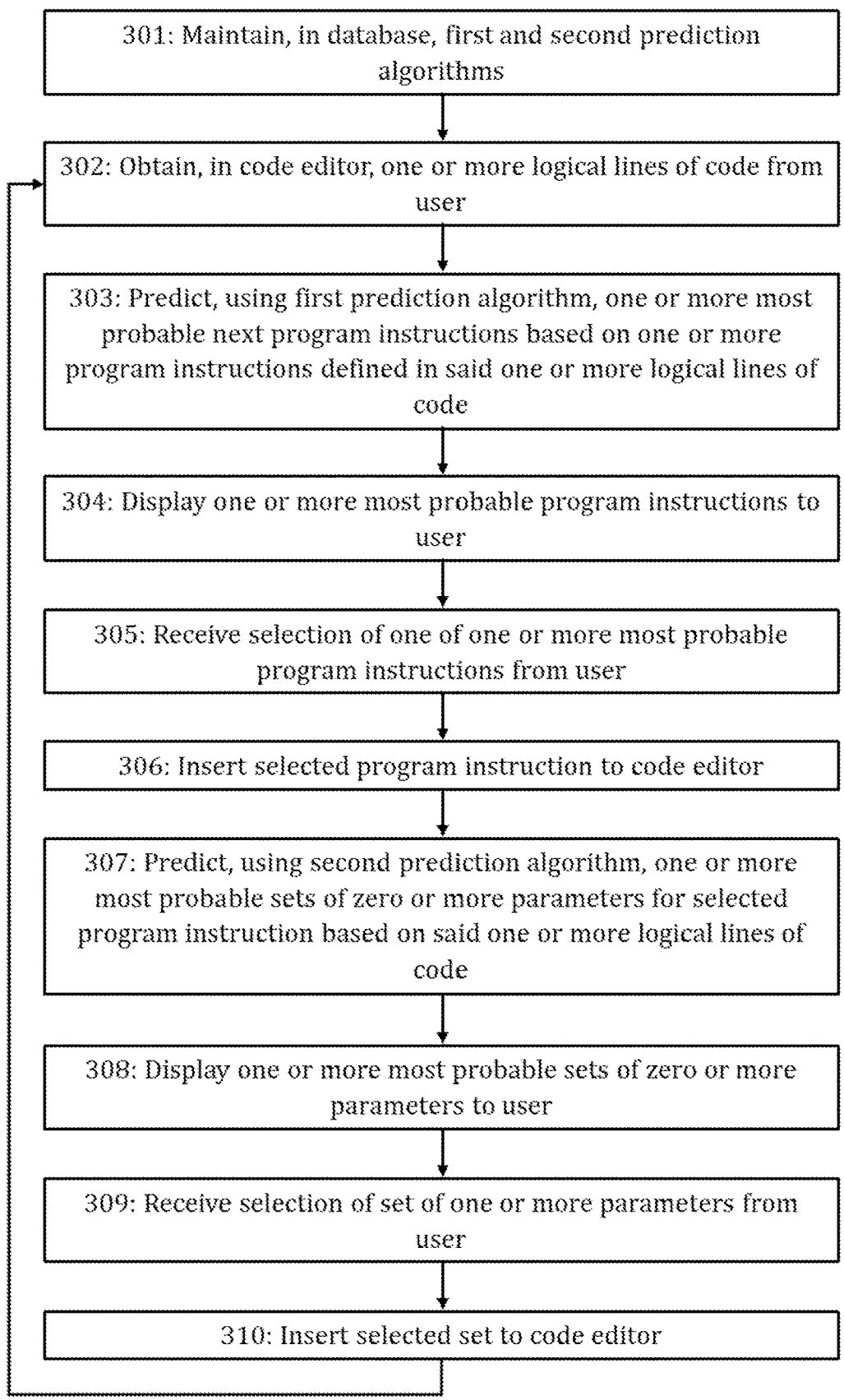
FIGS. 3, 6 and 7 illustrate processes according to embodiments.

FIG. 3 illustrates a process according to an embodiment for predicting next actions to be performed in a program or script that a user is writing and completing a logical line of code based on the results of said prediction. The illustrated process may be performed by the computing device 101 of FIG. 1 or the computing device 201 of FIG. 2.

Referring to FIG. 3, it is initially assumed that the computing device maintains, in block 301, in a database, a first prediction algorithm for predicting program instructions to be typed next in a code editor based at least on one or more preceding logical lines of code in the code editor and a second prediction algorithm for predicting at least sets of zero or more parameters for a program instruction based at least on the program instruction (for which the sets of zero or more parameters are to be predicted) and the one or more preceding program instructions and any parameters defined for said one or more preceding program instructions. The prediction using the second prediction algorithm may entail predicting both the number (and the type) of the zero or more parameters and their values. Said database may be an internal database of the computing device or an external database.

The first prediction algorithm may have been generated based on a first data set and the second prediction algorithm may have been generated based on a second data set which is, preferably, smaller than the first data set. The first and second data set may be partially overlapping. For example, the first data set may be a large data set comprising (source) code for a plurality of programs relating to a plurality of use cases and/or application (e.g., contents of a public library of programs) while the second data set may comprise (source) code for a plurality of programs (or even one or more programs) specific to a particular use case and/or application (or a particular limited set of related use cases and/or applications). The reason for this difference in predicting next program instructions and parameters is that program instructions and their order are typically more generic in nature (i.e., similar program instructions are employed in many applications in a similar manner) compared to values of parameters which may be defined very differently depending on the application in question. In some embodiments, the first data set and/or especially the second data set may be specific to the user or a group of users comprising said user. Said group of users may be, e.g., users associated with a specific company or organization. In other words, the first data set and/or especially the second data may comprise (source) code only for programs created by the user or the group of users. How the first and second prediction algorithms may be generated is discussed in detail in relation to FIGS. 6 and 7.

In some embodiments, the first prediction algorithm may be a first trained machine-learning algorithm or a first weighted search tree algorithm and the second prediction algorithm may be a second trained machine-learning algorithm. The first and/or second trained machine-learning algorithms may be based on one or more neural networks or one or more support vector machines. The one or more neural networks may comprise, for example, one or more recurrent neural networks, one or more convolutional neural networks or a combination thereof.

In some embodiments, the first and second prediction algorithms may be integrated into a single prediction algorithm.

The computing device obtains, in block 302, in a code editor (or specifically in a data buffer of the code editor), one or more logical lines of code for a program from a user via at least one user input device of the computing device. In other words, a user types one or more logical lines of code to the code editor running in the computing device. Said one or more logical lines of code may correspond to logical line(s) preceding a location of an insertion point in the GUI of the code editor. Said one or more logical lines of code may define one or more program instructions and a set of zero or more parameters for each of said one or more program instructions (the number of the zero or more parameters depending, for example, on the type of program instruction). At this point, it may be assumed that the program consists only of said one or more logical lines of code and is in an unfinished state. The program may be, for example, a script for test automation or robotic process automation. Said program may be associated with a use case or application for which said first prediction algorithm (e.g., a more generic prediction algorithm for predicting program instructions) and said second prediction algorithm (e.g., a use case or application-specific prediction algorithm for parameters of program instructions) may be applicable.

The computing device predicts, in block 303, using the first prediction algorithm, one or more most probable program instructions (e.g., functions or keywords) to be typed for a line following the one or more logical lines of code in the code editor based on said one or more logical lines of code in the code editor (or specifically based on the one or more program instructions defined in said one or more logical lines of code). The prediction may be based not only on contents of said one or more logical lines of code but also on their order (i.e., a sequence formed by the one or more program instructions). As mentioned above, the prediction in block 303 may be based on the one or more program instructions on said one or more lines (and their order), that is, not necessarily on any parameters for said program instructions. In general, the prediction using the first prediction algorithm may be based on a pre-defined number of preceding logical lines of code or all preceding logical lines of code written in a program. Thus, the first prediction algorithm may use all or only some of said one or more logical lines of codes preceding the line under analysis (depending also on the number of the one or more logical lines of code).

In some embodiments, the prediction in block 303 may comprise calculating a probability distribution of the next program instructions. Said probability distribution may be defined as a probability vector $p=[p_1\ p_2\ \ldots\ p_n]$, where each element of the probability vector corresponds to a program instruction and n is the number of the different (most probable) program instructions in the probability distribution. To give a simplistic example with a probability distribution of four (most probable) program instructions, the probability vector may be defined as $p=[0.03\ 0.17\ 0.7\ 0.1]$. Based on the probability vector, said one or more most probable program instructions may be determined.

Said one or more preceding logical lines of code may be pre-processed, in block 303, before they are used as an input of the first prediction algorithm. This may be especially pertinent in the case where the first prediction algorithm is a first trained machine-learning algorithm (e.g., based on one or more neural networks).

The pre-processing may be divided into two pre-processing phases for, first, extracting information from said one or more preceding logical lines of code (i.e., extracting information from the data buffer of the code editor) and, then, converting the information derived in the first phase to a format which may be used as an input of the first prediction algorithm. In the first pre-processing phase, the computing device may perform lexical analysis (or tokenization) on the one or more preceding logical lines of code so as to convert them into a sequence of lexical tokens (strings with an assigned and thus identified meaning). A lexical token or simply token is structured as a pair consisting of a token name and an optional token value. The token name is a category of lexical unit. Examples of common token names are identifier, keyword, separator, operator and literal. Each program instruction and each parameter defined for a program instruction may correspond to a single lexical token. The sequence of lexical tokens may be filtered so as to remove any lexical tokens not associated with program instructions. Additionally or alternatively, the pre-processing in the first phase may comprise, for example, syntactic and/or semantic analysis and/or validation functionalities.

In the second pre-processing phase, the computing device may perform word embedding for string data associated with said one or more logical lines of code (or specifically with each program instruction defined in the one or more logical lines of code). In other words, string data is mapped to numerical values or specifically to a vector comprising numerical values so that it may be used as an input of the machine-learning algorithm. This process is sometimes called "vectorization". Said string data may be derived according to the tokenization process described above. Additionally, normalization may be performed for at least some of the numerical values. In some embodiments, the vectorization may be performed using a separate machine-learning model (e.g., a neural network), that is, a machine-learning model not used (directly) by the first and second prediction algorithms.

The pre-processing may be performed by the code editor or the prediction engine or by both the code editor and the prediction engine. In the latter option, the initial pre-processing (e.g., generating lexical tokens) may be performed by the code editor and the results of said initial pre-processing may be forwarded to the prediction engine which then performs further pre-processing (e.g., converting lexical tokens into numerical values accepted by the first prediction algorithm).

The one or more most probable program instructions may have a predefined number. In other embodiments, the one or more most probable program instruction may correspond to program instructions for which a first prediction metric exceeds a pre-defined threshold. The first prediction metric for a program instruction may be defined simply as the accuracy or confidence of the prediction for that program instruction (determined, e.g., based on a probability vector). Preferably, the one or more most probable program instructions comprise a plurality of most probable program instructions.

The computing device displays, in block 304, at least the one or more most probable program instructions to the user via a display of the computing device. The one or more most probable program instructions may be displayed specifically in a graphical user interface (GUI) of the code editor. The one or more most probable program instructions may be shown, for example, as a context or pop-up menu located in the proximity of the logical line of code to be predicted. The one or more most probably program instructions may be arranged in an order from most probable to least probable.

In some embodiments, the computing device may also display, in block 304, for each of said one or more most probable program instructions, a value of at least one first prediction metric quantifying the accuracy or confidence in the predicting using the first prediction algorithm (i.e., the predicting in block 303). In some embodiments, the displaying the value of said at least one first prediction metric is performed only in response to detecting a mouse pointer being moved on top of a corresponding probable program instruction displayed in the graphical user interface of the code editor or in response to other user input or action.

The user may be able to make a selection from said one or more most probable program instructions via at least one user input device of the computing device (e.g., by clicking on one of the one or more most probable program instructions using a mouse or other pointing device). In response to receiving a selection of one of the one or more most probable program instructions via the at least one user input device in block 305, the computing device inserts, in block 306, a selected program instruction to the line in the code editor. In other words, the selected program instruction is automatically written on said line in the code editor.

After the program instruction has been selected by the user, the computing device predicts, in block 307, using the second prediction algorithm, one or more most probable sets of zero or more parameters for a selected program instruction based on the selected program instruction and said one or more logical lines of code. A set of zero parameters (i.e., a null or empty set) may be predicted if the selected program instruction requires zero mandatory parameters. In this case, said selected program instruction may still accept one or more optional parameters meaning that the prediction is not necessarily a trivial task in such a case. Obviously, only one null set may be included in the one or more probable sets. Preferably, said one or more most probable sets of zero or more parameters comprise one or more sets of one or more parameters.

As opposed to the prediction using the first prediction algorithm, in this case the prediction may take into account, not only the program instructions (e.g., functions), but also the parameters defined for said program instructions (e.g., numerical and string literals and constants, expressions and other statements, and their combinations). Each of the one or more most probable sets (excluding a possible null set) may comprise, for example, one or more numerical parameters (e.g., numerical literals or constants), one or more alphabetical parameters (e.g., strings or character literals), one or more tables or other data structures, one or more variables, one or more function calls and/or one or more references. To give an example, a set of one or more parameters may comprise a numerical literal such as "123" and a string literal such as "www.qentinel.com". In some embodiments, the prediction in block 307 may also handle contextual data outside program instructions and their parameters, to include things such as script settings, documentation and other annotations.

The process illustrated in FIG. 3 (as well as the following processes according embodiments) may be especially well-suited for performing prediction of program instructions and sets of zero or more parameters in scripts for test automation or robotic process automation. The reason for this is that in these applications the parameters defined for program instructions are typically constants (as opposed to being variables or function calls) and thus predicting parameters for program instructions is a somewhat simpler task in such applications. In some embodiments, it may be assumed that all the (predicted) parameters correspond to constants.

In some embodiments, the prediction in block 307 may be performed one parameter at a time. Namely, the computing device may, first, calculate, using the second prediction algorithm, a probability distribution of the most probable values for an initial parameter for said program instruction under analysis based at least on said program instruction and one or more program instructions preceding said program instruction and a set of zero or more parameters defined for said one or more program instructions. The probability distribution of the most probable values for a parameter may be defined as a probability vector, similar to as described in relation to block 303. Similarly, the computing device may calculate a probability distribution of the most probable values for each subsequent parameter for said program instruction under analysis based at least on said program instruction and one or more program instructions preceding said program instruction and a set of zero or more parameters defined for said one or more program instructions (and possibly earlier most likely parameter(s) for said program instruction). The number of parameters for the program instruction may be known based on said program instruction. Said one or more most probable sets of zero or more parameters may be determined based on the one or more probability vectors.

Similar to as described in relation to block 303, said one or more preceding logical lines of code and in this case also the selected program instruction may be pre-processed, in block 307, before they are used as an input of the second prediction algorithm. This may be especially pertinent in the case where the second prediction algorithm is a second trained machine-learning algorithm (e.g., based on one or more neural networks). Specifically, the computing device may perform, in a first pre-processing phase, lexical analysis (or tokenization) on the one or more preceding logical lines of code so as to convert them into a sequence of lexical tokens, similar to as described in relation to block 303. Additionally or alternatively, the pre-processing in the first pre-processing phase may comprise, for example, syntactic and/or semantic analysis and/or validation functionalities. The results of the pre-processing (of the first pre-processing phase) performed in connection with block 303 may alternatively be utilized here. In this case, the sequence of lexical tokens may be filtered so as to remove any lexical tokens not associated with program instructions or parameters. Moreover, in a second pre-processing phase, the computing device may perform word embedding for string data associated with said one or more logical lines of code (possibly derived through the tokenization process) and the selected program instruction. The result of the processing (or vectorization) is vector comprising numerical values and which is used as an input of the second trained machine-learning algorithm. Additionally, normalization may be performed, in the second pre-processing phase, for at least some of the numerical values. In some embodiments, the vectorization may be performed using a separate machine-learning model (e.g., a neural network), that is, a machine-learning model not used (directly) by the first and second prediction algorithms. The number of the zero or more parameters in each set of zero or more parameters may be defined based at least on the selected program instruction (or specifically on what type of inputs are required by the selected program instruction). The number of the zero or more parameters for different sets may be different if one or more optional parameters may be applied with the selected program instruction.

Similar to as discussed in relation to the first prediction algorithm, the prediction using the second prediction algorithm may, in general, be based on a pre-defined number of preceding logical lines of code or all preceding logical lines of code written in the program in the code editor (in addition to the program instruction defined in a current line). Thus, in some cases only a subset or subsequence of said one or more logical lines of code may be employed in the prediction in block 307.

Moreover, the one or more most probable sets of zero or more parameters may have a pre-defined number (i.e., N most probable sets may be provided, where N is a positive integer) or they may correspond to sets of parameters for which a second prediction metric exceeds a pre-defined threshold. The second prediction metric for a set of one or more parameters may be defined simply as the accuracy or confidence of the prediction for that set of one or more parameters. Preferably, the one or more most probable sets of parameters comprise a plurality of most probable program instructions.

The computing device displays, in block 308, at least the one or more most probable sets of zero or more parameters for the selected program instruction to the user via a display of the computing device. These options may be displayed to the user similar to as discussed in relation to block 304. A null set may be displayed as an empty line or with one or more pre-defined characters (e.g., " . . . " or "-"). In some embodiments, the computing device may also display, in block 308, for each of said one or more most probable sets of zero or more parameters, a value of at least one second prediction metric quantifying the accuracy or confidence in the predicting using the second prediction algorithm (i.e., the predicting in block 307). Also similar to discussion in relation to block 304, the user is able to make a selection from said one or more most probable sets of zero or more parameters via at least one user input device of the computing device.

In response to receiving a selection of a set of one or more parameters from the one or more most probable sets of zero or more parameters via the at least one user input device in block 309, the computing device inserts, in block 310, a selected set of one or more parameters to the line in the code editor so as to complete the (logical) line of code. In response to receiving a selection of a set of zero parameters (a null set) from the one or more most probable sets of zero or more parameters via the at least one user input device, the computing device does not insert anything to said line in the code editor as there is nothing to be inserted in that case (i.e., the line of code is already complete). In some embodiments, the computing device may always add (in block 310) a certain pre-defined terminating character (e.g., a semicolon in C-like programming languages) to the end of the logical line of code to complete said logical line of code. Once said (logical) line of code has been completed, the process may be repeated for the next line. In other words, blocks 302 to 310 of FIG. 3 may be repeated.

After being displayed a set of options (i.e., one or more program instructions or one or more sets of zero or more parameters) according to block 304 or 308, the user may also decide, in some cases, not to select any of the displayed options. For example, the user may instead, for example, click using a mouse on another logical line of code in the code editor (i.e., move the insertion point to another logical line of code) which may stop the displaying of the options (e.g., close down a pop-up menu) and possible also trigger the process of FIG. 3 again starting from block 302 or 307 (depending on where the user moved the insertion point). FIGS. 4 and 5 show two exemplary views of a graphical user interface of a code editor according to embodiments. Specifically, FIGS. 4 and 5 illustrate two phases in the prediction process discussed in relation to FIG. 3. Namely, FIG. 4 illustrates the displaying operation in block 304 and FIG. 5 illustrates the displaying operation in block 308.

In the scenario illustrated in FIG. 4, the user has started writing a script by writing multiple lines of code 401 (including multiple logical lines of code) but has not yet finished the script. The user has clicked with the mouse pointer to an empty line in the code editor which has triggered the prediction process (or specifically block 303 of FIG. 3). Consequently, a context menu (or a pop-up menu) 402 is shown. The context menu 402 comprises four most probable program instructions which are displayed in the order of highest probability (the top option corresponding to the most likely option). The context menu 402 enables the user to make a selection from the presented list of options by clicking on the desired option.

In FIG. 5, the user has selected one of the options in the context menu 402 illustrated in FIG. 4. Specifically, the user has selected "ClickText" which is a function which takes as its input 1-6 arguments. One said arguments ("text") is mandatory while the other five ("anchor", "timeout", "parent", "child" and "js") are all optional. In response to the selection, "ClickText" has been automatically inserted into the line for which prediction is carried out (as discussed in relation to block 306 of FIG. 3) and a prediction process for predicting the most probable set of zero or more arguments is performed (as discussed in relation to block 307 of FIG. 3). Similar to the results of prediction in FIG. 4, the one or more most probable sets of zero or more parameters (or arguments) derived through the prediction process are displayed in a context menu 501. Here specifically, seven most probable sets are displayed. Each of said seven sets comprises one or more parameters. Notably, the number of parameters is different for different sets of one or more parameters included in the context menu 501.

Figure 6:
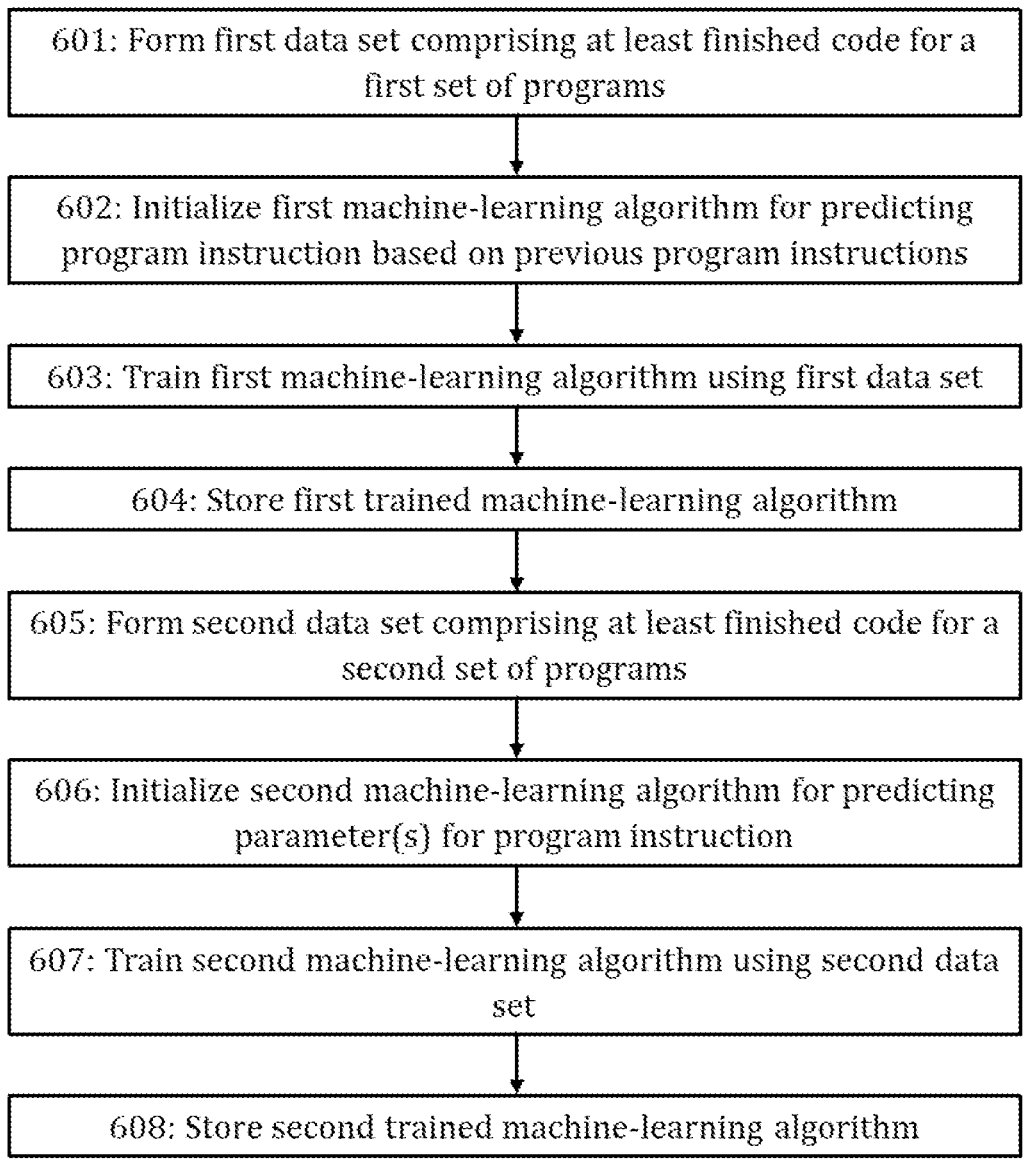

FIG. 6 illustrates a process according to embodiments for generating the first and second prediction algorithms employed in processes of FIGS. 3 to 5. Specifically, the first and second prediction algorithms are assumed here to be machine-learning algorithms. The process may be carried out by the same computing device which subsequently carries out the predicting using the first and second trained machine-learning algorithms according to embodiments (e.g., by any entity carrying out the processes illustrated in FIGS. 2 to 5 according to embodiments). Alternatively, the training may be carried out by a separate device or system (e.g., a computing system 121 of FIG. 1) connected to the computing device running the code editor (e.g., via a communications network). In this latter case, said computing device may specifically cause (or trigger) the generating and training of the first and second trained machine-learning algorithms by the computing system (e.g., by transmitting a request or command to the computing system). In some embodiments, one of the first and second machine-learning algorithms may be generated and trained by the computing device running the editor and the other by the (remote) computing system. In the following discussion, the entity performing the process is called simply an apparatus.

Referring to FIG. 6, the apparatus, first, forms, in block 601, a first data set comprising at least finished code for a first set of programs. The (source) code associated with the first set of programs defines a first plurality of sequences of program instructions (and parameters of said program instructions). These sequences of program instructions act as the training data set for the machine learning using a first machine-learning algorithm. The first data set may also comprise other types of information, for example, execution logs. The first data set may be defined as described in relation to elements 124 to 126 of FIG. 1 or elements 224 to 226 of FIG. 1.

The user may be able to define how the first data set is to be formed (e.g., which data sources should be included in the first data set). Specifically, the computing device may receive via at least one user input device one or more user inputs defining a scope or extent of the first data set and subsequently the apparatus may form the first data set according to said one or more user inputs. Said one or more user inputs may define, for example, one or more data sources to be employed for forming the first data set. If the apparatus here is the (remote) computing system (i.e., not the computing device running the code editor), the information on the scope or extent of the first data set as defined by the user may be transmitted from the computing device to the computing system via the communications network for enabling the apparatus to form the first data set according to the definition provided by the user.

The apparatus initializes, in block 602, a first machine-learning algorithm for predicting program instruction based on one or more preceding program instructions. The first machine-learning algorithm may be any machine learning algorithm as discussed above, e.g., a SVM-based algorithm or a neural network-based algorithm employing one or more recurrent neural networks or one or more convolutional neural networks. The initialization may comprise setting or selecting initial values for weights and/or parameters of the first machine learning algorithm (e.g., weights of one or more neural networks). The initial values may be random values (especially weights and parameters) or they may correspond to a predefined set of values known to result in a well-performing algorithm. Any known initialization technique may be employed in the initialization.

Then, the apparatus trains, in block 603, the first machine-learning algorithm using the first data set (or specifically the first plurality of sequences of program instructions defined therein). In the training, program instructions defined in the first plurality of sequences of program instructions define desired outputs of the first machine-learning algorithm while one or more preceding program instructions for each program instruction defining a desired output define a corresponding input of the first machine learning algorithm. The program instruction used for defining the desired output in the training may be any program instruction in the sequence (though the initial program instruction may, in some embodiments, be excluded). In other words, in the training, each program instruction in each program in the first set (with the possible exception of the first program instruction in a program) may define, in turn, a desired output and any program instructions preceding that line of code may define the input of the first machine-learning algorithm. To use common machine-learning terminology, said one or more preceding program instructions define features in the first machine-learning algorithm while the program instruction defines the label in the first machine-learning algorithm. The goal of the training is to adjust the weights/parameters of the first machine-learning algorithm (e.g., of one or more neural networks) so that the first machine-learning algorithm accurately maps the inputs to the desired outputs. The machine learning may be carried out using known machine-learning model, technique or algorithm such as using any of the ones mentioned above.

Said first data set comprising code for the first set of programs may be pre-processed, in block 603, before it is used as an input of the first machine-learning algorithm. This pre-processing may be carried out in a similar manner as described in relation to block 303 of FIG. 3. Specifically, the computing device may perform, in a first pre-processing phase, for each source code of the first set of programs, at least lexical analysis (or specifically tokenization) to form a sequence of tokens. This sequence of tokens may further be filtered to remove tokens not associated with program instructions. Further, the computing device may perform, in a second pre-processing phase, at least word embedding (or vectorization) for string data associated with a sequence of program instructions in each program in the first data set (e.g., string data in a sequence of lexical tokens relating to program instructions). In other words, string data is mapped to numerical values (or specifically to a vector comprising numerical values). The pre-processing may also comprise assigning labels to the first data set.

After the training in block 603, the apparatus stores, in block 604 the first trained machine-learning algorithm to the database of the computing device (i.e., the computing device running the code editor) or to another database accessible by the computing device. If the apparatus is a computing system connected to the computing device running the code editor via a communications network, the storing in block 604 may comprise causing storing of the first trained machine-learning algorithm to the database of the computing device by, for example, transmitting the first trained machine-learning algorithm to the computing device via the communications network for storing to the database of the computing device. The process of block 604 may be sometimes called "serialization". Alternatively, the computing system may store the first trained machine-learning algorithm to a database of the computing system which is accessible for the computing device over the communications network for performing predictions.

The second machine-learning algorithm is generated and trained in a similar manner as discussed for the first machine-learning algorithm above though some differences may also exist. Unless otherwise stated, the definitions and optional features discussed in relation to the first machine-learning algorithm may apply also here.

First, the apparatus forms, in block 605, a second data set comprising at least finished code for a second set of programs. The second data set acts as the training data set for the machine learning using a second machine-learning algorithm. As mentioned in relation to above embodiments, this second data set may be more limited compared to the first data set. For example, the second data may be specific to a particular application or use case while the first data set may encompass programs written for a variety of different applications or use cases. Similar to the first data set, the second data set may be formed based on one or more user inputs defining the extent or scope of the second data set (e.g., by defining one or more data sources to be used). Said one or more data sources may be, fully or partly, different for the first and second data sets. The second data set may be defined as described in relation to elements 124 to 126 of FIG. 1 or elements 224 to 226 of FIG. 1.

The apparatus initializes, in block 606, a second machine-learning algorithm for predicting at least sets of zero or more parameters for a program instruction based at least on said program instruction and the one or more preceding logical lines of code (that is, one or more lines preceding said program instruction for which parameters have not yet been defined). The second machine-learning algorithm may be a machine-learning algorithm of any type described above. The second machine-learning algorithm may be of the same type as the first machine-learning algorithm or of different type. The initialization may be carried as described for the first machine-learning algorithm in relation to block 602.

The apparatus trains, in block 607, the second machine-learning algorithm using the second data set. In the training, the sets of zero or more parameters defined in the second set of programs for corresponding program instructions define desired outputs of the second machine-learning algorithm and a corresponding program instruction for which a set of zero or more parameters is to be calculated and one or more preceding program instructions and sets of zero or more parameters defined for said one or more preceding program instructions define a corresponding input of the second machine learning algorithm. The set of zero or more parameters used for defining the desired output in the training may be any set of zero or more parameters defined for a program instruction (e.g., a function) in any logical line of code in the program following the first (i.e., initial) logical line of code. In other words, in the training, parameter(s) on each logical line of code in each program in the second set (with the possible exception of the first logical line of code in a program) may define, in turn, a desired output and a program instruction (e.g., function or a keyword) defined on that logical line of code and any logical lines of code preceding that logical line of code may define the input of the second machine-learning algorithm. To use common machine-learning terminology, the program instruction defined on a given logical line of code and one or more preceding lines of code define features in the second machine-learning algorithm while the set of zero or more parameters defined in the given logical line of code define the label in the second machine-learning algorithm. The goal of the training is to adjust the weights/parameters of the second machine-learning algorithm (e.g., of one or more neural networks) so that the second machine-learning algorithm accurately maps the inputs (i.e., features) to the desired outputs (i.e., labels).

Said second data set comprising code for the second set of programs may be pre-processed, in block 607, before it is used as an input of the second machine-learning algorithm. This pre-processing may be carried out in a similar manner as described in relation to block 307 of FIG. 3. Specifically, the computing device may perform, in a first pre-processing phase, for each source code of the second set of programs, at least lexical analysis (or specifically tokenization) to form a sequence of lexical tokens. This sequence of tokens may further be filter to remote tokens not associated with either program instructions or parameters. Further, the computing device may perform, in a second pre-processing phase, at least word embedding (or vectorization) for string data associated with sequence of program instructions in each program in the second data set (as described in relation to previous embodiments). In other words, string data (e.g., string data in a sequence of lexical tokens relating to program instructions or parameters of program instructions) is mapped to numerical values (or specifically to a vector comprising numerical values). The pre-processing may also comprise assigning labels to the second data set.

The apparatus stores, in block 608, the second trained machine-learning algorithm to the database of the computing device (i.e., of the computing device running the code editor). This step may also be carried out similar to as described for the first trained machine-learning algorithm in block 604. Subsequently, the computing device may employ said stored first and second trained machine learning algorithms for performing the prediction according to embodiments.

While FIG. 6 illustrates the generating and training of the first machine-learning algorithm followed by the generating and training of the second machine-learning algorithm, in other embodiments, the order of these operations may be different or only one of the first and second machine-learning algorithm may be generated and trained. In some embodiments, one of the first and second machine-learning algorithms is generated and trained by the computing device (a local device) and the other by the computing system (a remote device).

While machine-learning solutions enable prediction with high accuracy assuming that enough training is carried out for the machine-learning algorithm, the training of the machine-learning algorithms can be computationally quite demanding. In some instances, use of machine learning for one or both of the first and second prediction algorithms may not be expedient as equally good results could be achieved even with simpler prediction algorithms. One example of such a simpler prediction algorithm is a weighted search tree-based prediction algorithm (to be discussed below in detail). Another example is a fuzzy search-based prediction algorithm. A fuzzy search (equally called a fuzzy string search or approximate string matching) is a search process which finds non-exact matches which are likely to be relevant to a search argument. A fuzzy search-based prediction algorithm may be based, for example, on calculating a distance measure (e.g., a Levenshtein distance) or on full text search (FTS) fuzzy_matching.

Figure 7:
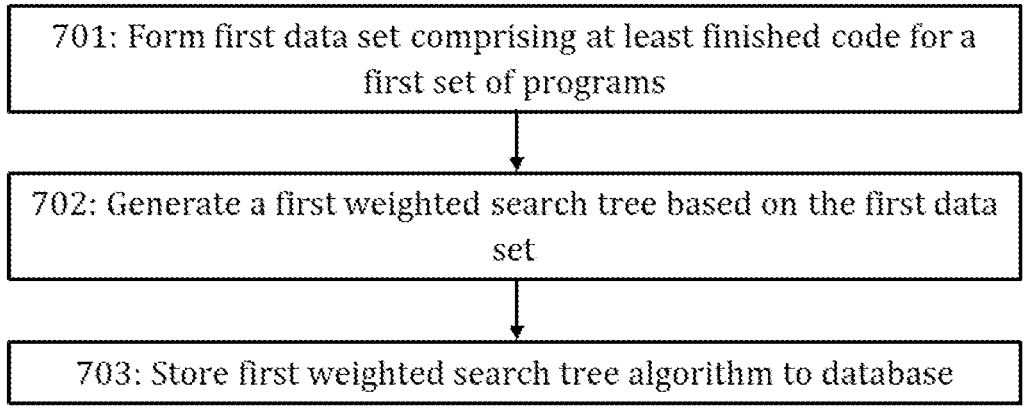

In the following, the weighted search tree-based prediction algorithm is discussed in further detail as an example. The weighted search tree-based prediction algorithm may be used especially as the first prediction algorithm for predicting the next program instruction based on preceding program instructions. FIG. 7 illustrates a process for generating a weighted search tree-based algorithm especially for this purpose. The illustrated process may be carried out by the same computing device which subsequently carries out the predicting using the first and second prediction algorithms according to embodiments (e.g., by any entity carrying out the processes illustrated in FIGS. 2 to 5 according to embodiments). Alternatively, the training may be carried out by a separate device or system (e.g., a computing system 121 of FIG. 2) connected to the computing device running the code editor (e.g., via communications network). In this latter case, said computing device may specifically cause (or trigger) the generating and training of the first and second trained machine-learning algorithms by the computing system (e.g., by transmitting a request or command to the computing system). In the following, the entity performing the process is called simply an apparatus.

Referring to FIG. 7, the apparatus first forms, in block 701, a first data set comprising at least finished code for a first set of programs. This step may correspond fully to block 601 of FIG. 6.

Then, the apparatus generates, in block 702, a first weighted search tree based on the first data set. The first weighted search tree is defined as follows. A node of the first weighted search tree having a depth of a positive integer n corresponds to an nth program instruction in at least one of the first set of programs. Depth of a node is defined as the number of edges from said node to the root node. In other words, each sequence of program instructions forming a program of the first set of programs corresponds to a path between a root node of the first weighted search tree and a leaf node of the first weighted search tree. Moreover, each child node (i.e., each node which is not the root node) of the first weighted search tree is associated with a weight indicating the number of occurrences of a corresponding program instruction at a corresponding position in the first set of programs. Thus, a large value of a weight associated with a node indicates that a program instruction defined by said node is used often at that particular position in the code For each program in the first set, the weighted search tree may be supplemented, in block 702, as follows. Each program comprises a sequence of program instructions. In the generating in block 702, the apparatus moves through said sequence one program instruction at a time so that for each program instruction it is checked whether said program instruction is included in the first weighted search tree at the same position as in the current program. If this is not the case, the apparatus adds a new child node corresponding to the program instruction to the weighted search tree. Initially, a weight of one may be applied to this new child node. If said program instruction is included in the first weighted search tree at the same position, the apparatus increments the value of the weight associated with a corresponding by one. This process is repeated for each program instruction in the sequence forming the program.

In some embodiments, the pre-processing discussed in relation to block 603 of FIG. 6 may be carried out also in this case. In other words, the generation of the first weighted search tree may comprise pre-processing. the first data set by performing tokenization and filtering of the tokenization results to derive a sequence of program instructions (or specifically a sequence of lexical tokens corresponding to program instructions). In some embodiments, word embedding may also be performed.

The apparatus stores, in block 703, the first weighted search tree algorithm for searching the first weighted search tree to the database of the computing device or to another database accessible by the computing device. The storing may be carried out as described in relation to block 604 of FIG. 6. Subsequently, the first weighted search tree algorithm may be used, as the first prediction algorithm, in processes of FIGS. 3 and 4. The second prediction algorithm may be generated, for example, as described in relation to blocks 605 to 608 FIG. 6.

The predicting using the first weighted search tree based on one or more program instructions defined in one or more logical lines of code (e.g., in block 303 of FIG. 3) may be performed as follows. The computing device tracks a path through the weighted search tree (from the root node to a child node) based on the sequence of one or more program instructions in the one or more logical lines of code. Said path ends in a particular node of the weighted search tree which is assumed here to have one or more child nodes. Then, the computing device checks which child node of said particular node is assigned with the largest weights (i.e., which program instructions have usually followed said sequence of one or more program instructions). The apparatus selects one or more most probable program instructions based on the weights assigned to said one or more child nodes for displaying to the user.

Figure 8:
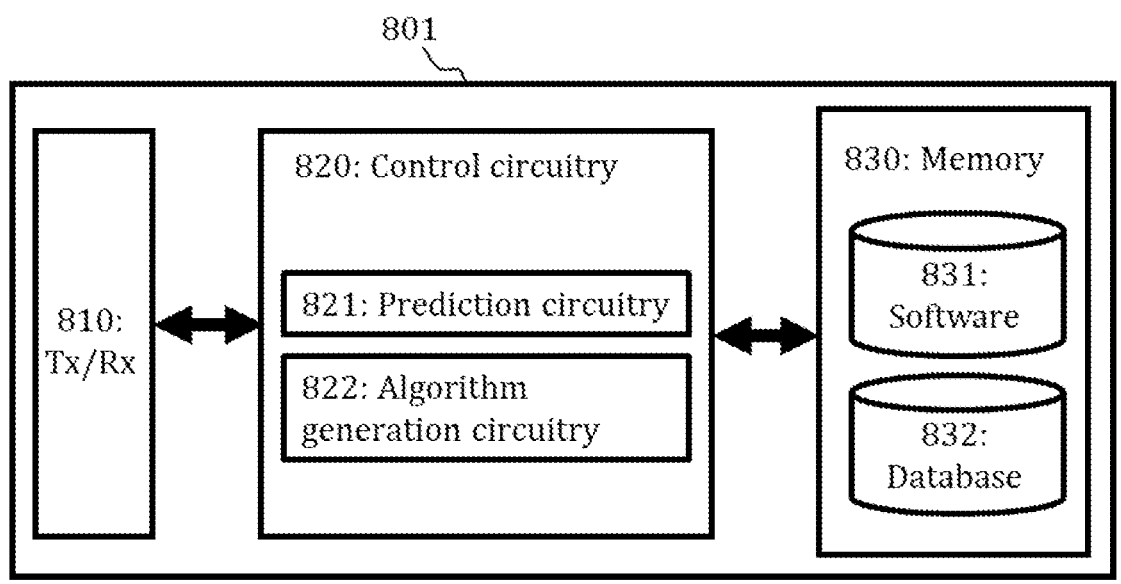
FIG. 8 illustrates an apparatus according to embodiments.

FIG. 8 illustrates an apparatus 801 configured to carry out the functions or some of the functions described above in connection with the computing device 101 or the computing device 201 illustrated in FIG. 1 or 2, respectively. The apparatus 801 may be an electronic device comprising electronic circuitries. The apparatus 801 may be a separate entity or a plurality of separate entities (i.e., a distributed device). The apparatus 801 may be connected to a communications network, similar to as depicted in FIG. 1. The apparatus 801 may comprise a control circuitry 820 such as at least one processor, and at least one memory 830 including a computer program code (software) 831 wherein the at least one memory and the computer program code (software) are configured, with the at least one processor, to cause the apparatus 801 to carry out any of the embodiments described above (specifically embodiments described in relation to the computing device).

The memory 830 may be implemented using any suitable data storage technology, such as semiconductor-based memory devices, flash memory, magnetic memory devices and systems, optical memory devices and systems, fixed memory and removable memory. The memory may comprise a database 832 which may be or comprise any of the database 103 of FIG. 1, the database 203 of FIG. 2 and the database 223 of FIG. 2 or it may a separate database from said databases. The memory 830 may be connected to the control circuitry 820 via an interface.

The apparatus 801 may further comprise one or more interfaces 810 comprising hardware and/or software for realizing communication connectivity according to one or more communication protocols. Specifically, the one or more interfaces 810 may comprise, for example, interfaces providing a connection to a (remote) computing system via a communications network. The one or more interfaces 810 may enable receiving user inputs via one or more user input devices (e.g., a keyboard and a mouse). The one or more interfaces 810 may comprise standard well-known components such as an amplifier, filter, frequency-converter, (de)modulator, and encoder/decoder circuitries and one or more antennas.

The control circuitry 820 may comprise prediction circuitry 821. The prediction circuitry 821 may be configured to carry out at least some of blocks of FIG. 3. The prediction circuitry 821 may correspond to the prediction engine 103 of FIG. 1 or the prediction engine 203 of FIG. 2. The control circuitry 820 may further comprise a algorithm generation circuitry 822. The algorithm generation circuitry 820 may be configured to carry out at least some of blocks of FIG. 6 and/or FIG. 7. The pre-processing circuitry 820 may correspond to the algorithm generation unit 222 of FIG. 2.

In some embodiments, the algorithm generation circuitry 822 may be omitted and corresponding functionalities may be carried out by a separate computing device or system, as described in relation to FIG. 1.

In some embodiments, the apparatus 801 of FIG. 8 may correspond to a (remote) computing system (or a part thereof) such as the computing system 121 of FIG. 1. In such embodiments, the computing system 801 may comprise one or more communication control circuitry 820, such as at least one processor, and at least one memory 830, including one or more algorithms 831, such as a computer program code (software) wherein the at least one memory and the computer program code (software) are configured, with the at least one processor, to cause the computing system to carry out any one of the exemplified functionalities of the computing system described above. In such embodiments, the prediction circuitry 821 may be omitted. Further, the algorithm generation circuitry 822 may be specifically configured to carry out at least some of the functionalities described above by means of any of FIGS. 6 and 7 using one or more individual circuitries and the one or more interfaces 810 may comprise, for example, interfaces providing a connection (e.g., via a communications network) at least to one or more computing device (such as the computing device 101 of FIG. 1). Otherwise, the definitions given above in relation to FIG. 8 may apply for the computing system. Also in this case, the apparatus 801 (i.e., the computing system) may comprise a control circuitry 820 such as at least one processor, and at least one memory 830 including a computer program code (software) 831 wherein the at least one memory and the computer program code (software) are configured, with the at least one processor, to cause the apparatus 801 to carry out any one of the embodiments described above (specifically embodiments described in relation to the computing system).

As used in this application, the term 'circuitry' may refer to one or more or all of the following: (a) hardware-only circuit implementations, such as implementations in only analog and/or digital circuitry, and (b) combinations of hardware circuits and software (and/or firmware), such as (as applicable): (i) a combination of analog and/or digital hardware circuit(s) with software/firmware and (ii) any portions of hardware processor(s) with software, including digital signal processor(s), software, and memory(ies) that work together to cause an apparatus, such as a terminal device or an access node, to perform various functions, and (c) hardware circuit(s) and processor(s), such as a microprocessor(s) or a portion of a microprocessor(s), that requires software (e.g. firmware) for operation, but the software may not be present when it is not needed for operation. This definition of 'circuitry' applies to all uses of this term in this application, including any claims. As a further example, as used in this application, the term 'circuitry' also covers an implementation of merely a hardware circuit or processor (or multiple processors) or a portion of a hardware circuit or processor and its (or their) accompanying software and/or firmware. The term 'circuitry' also covers, for example and if applicable to the particular claim element, a baseband integrated circuit for any computing or network device.

In an embodiment, at least some of the processes described in connection with FIGS. 3 to 7 may be carried out by an apparatus (e.g., computing device or a computing system) comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 3 to 7 or operations thereof.

Embodiments as described may also be carried out in the form of a computer process defined by a computer program or portions thereof. Embodiments of the methods described in connection with FIGS. 3 to 7 may be carried out by executing at least one portion of a computer program comprising corresponding instructions. The computer program may be provided as a computer readable medium comprising program instructions stored thereon or as a non-transitory computer readable medium comprising program instructions stored thereon. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a per-son skilled in the art that the described embodiments may, but are not required to, be combined with other embodiments in various ways.

The invention claimed is:

1. A computing device comprising:
    at least one processor; and
    at least one memory including computer program code, the at least one memory and the computer program code configured to, with the at least one processor, cause the computing device to perform:
    maintaining, in a database, a first prediction algorithm for predicting next program instructions based at least on one or more preceding program instructions and a second prediction algorithm for predicting at least sets of zero or more parameters for a program instruction based at least on said program instruction and one or more preceding program instructions and any parameters defined for said one or more preceding program instructions;
    obtaining, in a code editor, one or more logical lines of code for a program from a user via at least one user input device of the computing device, wherein said one or more logical lines of code define one or more program instructions and a set of zero or more parameters for each of said one or more program instructions;
    predicting, using the first prediction algorithm, one or more most probable program instructions to be typed for a line following the one or more logical lines of code based on said one or more program instructions;
    displaying at least the one or more most probable program instructions to the user via a display of the computing device;
    in response to receiving a selection of one of the one or more most probable program instructions via the at least one user input device, inserting a selected program instruction to the line in the code editor;
    predicting, using the second prediction algorithm, one or more most probable sets of zero or more parameters for a selected program instruction based on the selected program instruction and said one or more logical lines of code;
    displaying at least the one or more most probable sets of zero or more parameters to the user via the display; and
    in response to receiving a selection of a set of one or more parameters from the one or more most probable sets of zero or more parameters via the at least one user input device, inserting the selected set of the one or more parameters to the line in the code editor to complete the line.

2. The computing device according to claim 1, wherein the at least one memory and the computer program code are configured, with the at least one processor, to cause the computing device to further perform:
    displaying, along with each of the one or more most probable program instructions, a value of at least one first prediction metric quantifying the accuracy or confidence in the predicting using the first prediction algorithm; and/or
    displaying, along with each of the one or more most probable sets of zero or more parameters, a value of at least one second prediction metric quantifying the accuracy or confidence in the predicting using the second prediction algorithm.

3. The computing device according to claim 1, wherein the predicting using one or both of the first prediction algorithm and the second prediction algorithm is based on both contents of said one or more logical lines of code and an order of said one or more logical lines of code.

4. The computing device according to claim 1, wherein the first prediction algorithm is a first trained machine-learning algorithm, a first weighted search tree algorithm or a first fuzzy search based prediction algorithm and the second prediction algorithm is a second trained machine-learning algorithm or a second fuzzy search based prediction algorithm.

5. The computing device according to claim 1, wherein the first prediction algorithm has been generated based on a first data set comprising at least finished code for a first set of programs defining a first plurality of sequences of program instructions and the second prediction algorithm has been generated based on a second data set comprising at least finished code for a second set of programs defining a second plurality of sequences of program instructions and sets of zero or more parameters of the program instructions in the second plurality of sequences, the first data set being a generic data set encompassing multiple use cases and applications and the second data being specific at least to a particular use case or application.

6. The computing device according to claim 5, wherein the first set of programs consists of programs created by a plurality of users and the second set of programs consists only of programs created previously by the user or a pre-defined group of users to which the user belongs.

7. The computing device according to claim 5, wherein the first trained machine-learning algorithm and/or the second trained machine-learning algorithm is based on one or more neural networks or one or more support vector machines, the one or more neural networks comprising one or more recurrent neural networks, one or more convolutional neural networks or a combination thereof.

8. The computing device according to claim 7, wherein the first prediction algorithm is the first trained machine-learning algorithm and the at least one memory and the computer program code are configured, with the at least one processor, to cause the computing device further to generate the first trained machine-learning algorithm by performing the following or to cause a computing system connected via a communications network to the computing device to perform the following:
    forming the first data set;
    initializing a first machine-learning algorithm;
    training the first machine-learning algorithm using the first data set, wherein, in the training, program instructions defined in the first plurality of sequences of program instructions define desired outputs of the first machine-learning algorithm and one or more preceding program instructions, for each program instruction defining a desired output, define a corresponding input of the first machine-learning algorithm; and
    storing a first trained machine-learning algorithm to the database of the computing device.

9. The computing device according to claim 7, wherein the first prediction algorithm is the first weighted search tree algorithm and the at least one memory and the computer program code are configured, with the at least one processor, to cause the computing device further to generate the first search tree algorithm by performing the following or to cause a computing system connected via a communications network to the computing device to generate the first weighted search tree algorithm by performing the following:
    forming the first data set;
    generating a first search tree based on the first data set, wherein a node of the first search tree having a depth of a positive integer n corresponds to an nth program instruction in at least one of the first set of programs so that each sequence of program instructions forming a program of the first set of programs corresponds to a path between a root node of the first search tree and a leaf node of the first search tree, each child node of the first search tree being associated with a weight indicating the number of occurrences of a corresponding program instruction at a corresponding position in the first set of programs; and storing the first search tree algorithm for searching the first search tree to the database of the computing device.

10. The computing device according to claim 7, wherein the second prediction algorithm is the second trained machine-learning algorithm and the at least one memory and the computer program code are configured, with the at least one processor, to cause the computing device further to generate the second trained machine-learning algorithm by performing the following or to cause a computing system connected via a communications network to the computing device to generate the second trained machine-learning algorithm by performing the following:

forming the second data set;

initializing a second machine-learning algorithm;

training the second machine-learning algorithm using the second data set, wherein, in the training, the sets of zero or more parameters defined in the second set of programs for corresponding program instructions define desired outputs of the second machine-learning algorithm and a corresponding program instruction for which a set of zero or more parameters is to be calculated and one or more preceding program instructions and sets of zero or more parameters defined for said one or more preceding program instructions define a corresponding input of the second machine-learning algorithm; and storing the second trained machine-learning algorithm to the database.

11. The computing device according to claim 8, wherein the at least one memory and the computer program code are configured, with the at least one processor, to cause the computing device to further perform, before generation of the first and second prediction algorithms:

receiving one or more user inputs defining an extent of at least one of the first data set and the second data set via said at least one user input device; and causing the forming of said at least one of the first data set and the second data set according to said one or more user inputs.

12. A computing system comprising:

at least one processor; and at least one memory including computer program code, the at least one memory and computer program code configured to, with the at least one processor, cause the computing system to perform:

forming a first data set comprising at least finished code for a first set of programs defining a first plurality of sequences of program instructions and a second data set comprising at least finished code for a second set of programs defining a second plurality of sequences of program instructions and sets of zero or more parameters of the program instructions in the second plurality of sequences;

initializing a first machine-learning algorithm and a second machine-learning algorithm;

training the first machine-learning algorithm using the first data set, wherein, in the training, program instructions defined in the first plurality of sequences of program instructions define desired outputs of the first machine-learning algorithm and one or more preceding program instructions for each program instruction defining a desired output define a corresponding input of the first machine-learning algorithm;

training the second machine-learning algorithm using the second training data set, wherein, in the training, the sets of zero or more parameters defined in the second set of programs for corresponding program instructions define desired outputs of the second machine-learning algorithm and a corresponding program instruction for which a set of zero or more parameters is to be calculated and one or more preceding program instructions define a corresponding input of the machine-learning learning algorithm; and causing storing first and second trained machine-learning algorithms to a database accessible by a computing device for running a code editor.

13. A system comprising a computing device and a computing system, wherein the computing device comprises:

at least one processor; and at least one memory including computer program code, the at least one memory and computer program code configured to, with the at least one processor, cause the computing device to perform:

maintaining, in a database, a first prediction algorithm for predicting next program instructions based at least on one or more preceding program instruction and a second prediction algorithm for predicting at least sets of zero or more parameters for a program instruction based at least on said program instruction and one or more preceding program instructions and any parameters defined for said one or more preceding program instructions;

obtaining, in a code editor, one or more logical lines of code for a program from a user via at least one user input device of the computing device, wherein said one or more logical lines of code define one or more program instructions and a set of zero or more parameters for each of said one or more program instructions;

predicting, using the first prediction algorithm, one or more most probable program instructions to be typed for a line following the one or more logical lines of code based on said one or more program instructions;

displaying at least the one or more most probable program instructions to the user via a display of the computing device;

in response to receiving a selection of one of the one or more most probable program instructions via the at least one user input device, inserting a selected program instruction to the line in the code editor;

predicting, using the second prediction algorithm, one or more most probable sets of zero or more parameters for a selected program instruction based on the selected program instruction and said one or more logical lines of code;

displaying at least the one or more most probable sets of the zero or more parameters to the user via the display; and in response to receiving a selection of a set of one or more parameters from the one or more most probable sets of the zero or more parameters via the at least one user input device, inserting the selected set of the one or more parameters to the line in the code editor to complete the line; and the computing system comprises:
at least one processor; and
at least one memory including computer program code, the at least one memory and computer program code configured to, with the at least one processor, cause the computing system to perform:
forming a first data set comprising at least finished code for a first set of programs defining a first plurality of sequences of program instructions and a second data set comprising at least finished code for a second set of programs defining a second plurality of sequences of program instructions and sets of zero or more parameters of the program instructions in the second plurality of sequences;
initializing a first machine-learning algorithm and a second machine-learning algorithm;
training the first machine-learning algorithm using the first data set, wherein, in the training, program instructions defined in the first plurality of sequences of program instructions define desired outputs of the first machine-learning algorithm and one or more preceding program instructions for each program instruction defining a desired output define a corresponding input of the first machine-learning algorithm;
training the second machine-learning algorithm using the second training data set, wherein, in the training, the sets of zero or more parameters defined in the second set of programs for corresponding program instructions define desired outputs of the second machine-learning algorithm and a corresponding program instruction for which a set of zero or more parameters is to be calculated and one or more preceding program instructions define a corresponding input of the second machine-learning algorithm; and
causing storing first and second trained machine-learning algorithms to a database accessible by the computing device for running a code editor.

14. A non-transitory computer readable media having stored thereon instructions that, when executed by a computing device, cause the computing device to perform:
maintaining, in a database, a first prediction algorithm for predicting next program instructions based at least on one or more preceding program instructions and a second prediction algorithm for predicting at least sets of zero or more parameters for a program instruction based at least on said program instruction and one or more preceding program instructions and any parameters defined for said one or more preceding program instructions;
obtaining, in a code editor, one or more logical lines of code for a program from a user via at least one user input device of the computing device, wherein said one or more logical lines of code define one or more program instructions and a set of zero or more parameters for each of said one or more program instructions;
predicting, using the first prediction algorithm, one or more most probable program instructions to be typed for a line following the one or more logical lines of code based on said one or more program instructions;
displaying at least the one or more most probable program instructions to the user via a display of the computing device;
in response to receiving a selection of one of the one or more most probable program instructions via the at least one user input device, inserting a selected program instruction to the line in the code editor;
predicting, using the second prediction algorithm, one or more most probable sets of zero or more parameters for a selected program instruction based on the selected program instruction and said one or more logical lines of code;
displaying at least the one or more most probable sets of the zero or more parameters to the user via the display; and
in response to receiving a selection of a set of one or more parameters from the one or more most probable sets of the zero or more parameters via the at least one user input device, inserting the selected set of the one or more parameters to the line in the code editor to complete the line.

15. A method comprising:
maintaining, in a database, a first prediction algorithm for predicting next program instructions based at least on one or more preceding program instructions and a second prediction algorithm for predicting at least sets of zero or more parameters for a program instruction based at least on said program instruction and one or more preceding program instructions and any parameters defined for said one or more preceding program instructions;
obtaining, in a code editor, one or more logical lines of code for a pro-gram from a user via at least one user input device of a computing device, wherein said one or more logical lines of code define one or more program instructions and a set of zero or more parameters for each of said one or more program instructions;
predicting, using the first prediction algorithm, one or more most probable program instructions to be typed for a line following the one or more logical lines of code based on said one or more program instructions;
displaying at least the one or more most probable program instructions to the user via a display of the computing device;
in response to receiving a selection of one of the one or more most probable program instructions via the at least one user input device, inserting a selected program instruction to the line in the code editor;
predicting, using the second prediction algorithm, one or more most probable sets of zero or more parameters for a selected program instruction based on the selected program instruction and said one or more logical lines of code;
displaying at least the one or more most probable sets of the zero or more parameters to the user via the display; and
in response to receiving a selection of a set of one or more parameters from the one or more most probable sets of the zero or more parameters via the at least one user input device, inserting the selected set of the one or more parameters to the line in the code editor to complete the line.

* * * * *